United States Patent [19]
Roote et al.

[11] Patent Number: 5,642,650
[45] Date of Patent: Jul. 1, 1997

[54] STOCK DEPLETION SENSOR

[75] Inventors: Michael S. Roote, Chesterland; Richard M. Amendolea, Canfield; Frederick A. McLaughlin, Columbiana, all of Ohio

[73] Assignee: Tri-Vision International Corporation, Twinsburg, Ohio

[21] Appl. No.: 554,722

[22] Filed: Nov. 7, 1995

[51] Int. Cl.$^6$ .................................................. B23B 5/08
[52] U.S. Cl. ........................ 82/126; 82/127; 82/129
[58] Field of Search ........................ 82/110, 124, 125, 82/126, 127, 129

[56] References Cited

U.S. PATENT DOCUMENTS

| | | | |
|---|---|---|---|
| 1,772,148 | 8/1930 | Hornberger | 82/127 |
| 3,152,810 | 10/1964 | Brinkman. | |
| 3,498,618 | 3/1970 | Hultgren. | |
| 3,541,903 | 11/1970 | Brinkman. | |
| 3,691,885 | 9/1972 | Fridman et al. | 82/127 X |
| 3,814,299 | 6/1974 | Spercel | 226/162 |
| 4,014,558 | 3/1977 | Brinkman. | |
| 4,088,230 | 5/1978 | Doe et al. | 214/1.2 |
| 5,029,499 | 7/1991 | Okitsu | 82/127 X |
| 5,095,789 | 3/1992 | Mukai et al. | 82/127 X |
| 5,299,351 | 4/1994 | Takahashi et al. | 29/798 |

OTHER PUBLICATIONS

National ACME, "Acme–Gridley Multiple Spindle", Handbook for Operators, 1980, pp. 16–21.

*Primary Examiner*—M. Rachuba
*Assistant Examiner*—Henry W. H. Tsai
*Attorney, Agent, or Firm*—Calfee, Halter & Griswold LLP

[57] ABSTRACT

Depleted stock feeder tubes, and feed malfunctions, are detected in bar fed machines such as automatic screw machines, CNC lathes and the like, employing reciprocating feed tubes with flexible feed fingers that grip the stock, with a sensor assembly mounted on a pivoted stock feeding lever or other feeder mechanism. The body of the sensor assembly is positioned to press against a roller or other connecting member extending laterally from the feed tube assembly, and retract the feed tube. A plunger or other reciprocating contact member is mounted in and biased to extend from the body. If a feed tube is stocked when the feed tube is retracted, the force required to retract the feed tube is greater than the biasing force on the plunger, the plunger moves, and a proximity sensor or other detector senses the new position or motion of the plunger. If stock is depleted, the force required to retract the feed tube is less than the biasing force on the plunger, the plunger does not move, and a signal is generated to stop the machine or take other corrective action.

18 Claims, 17 Drawing Sheets

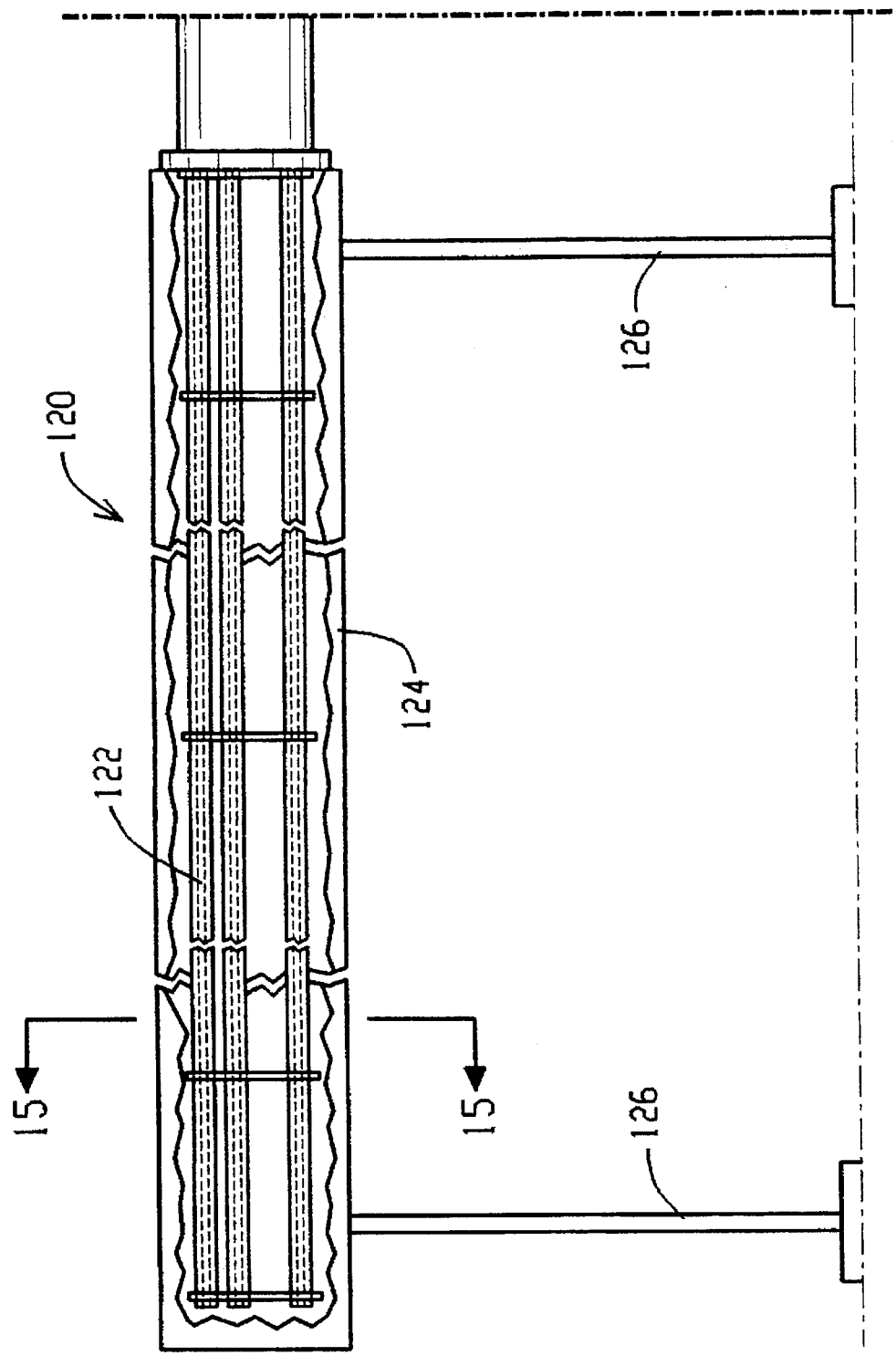

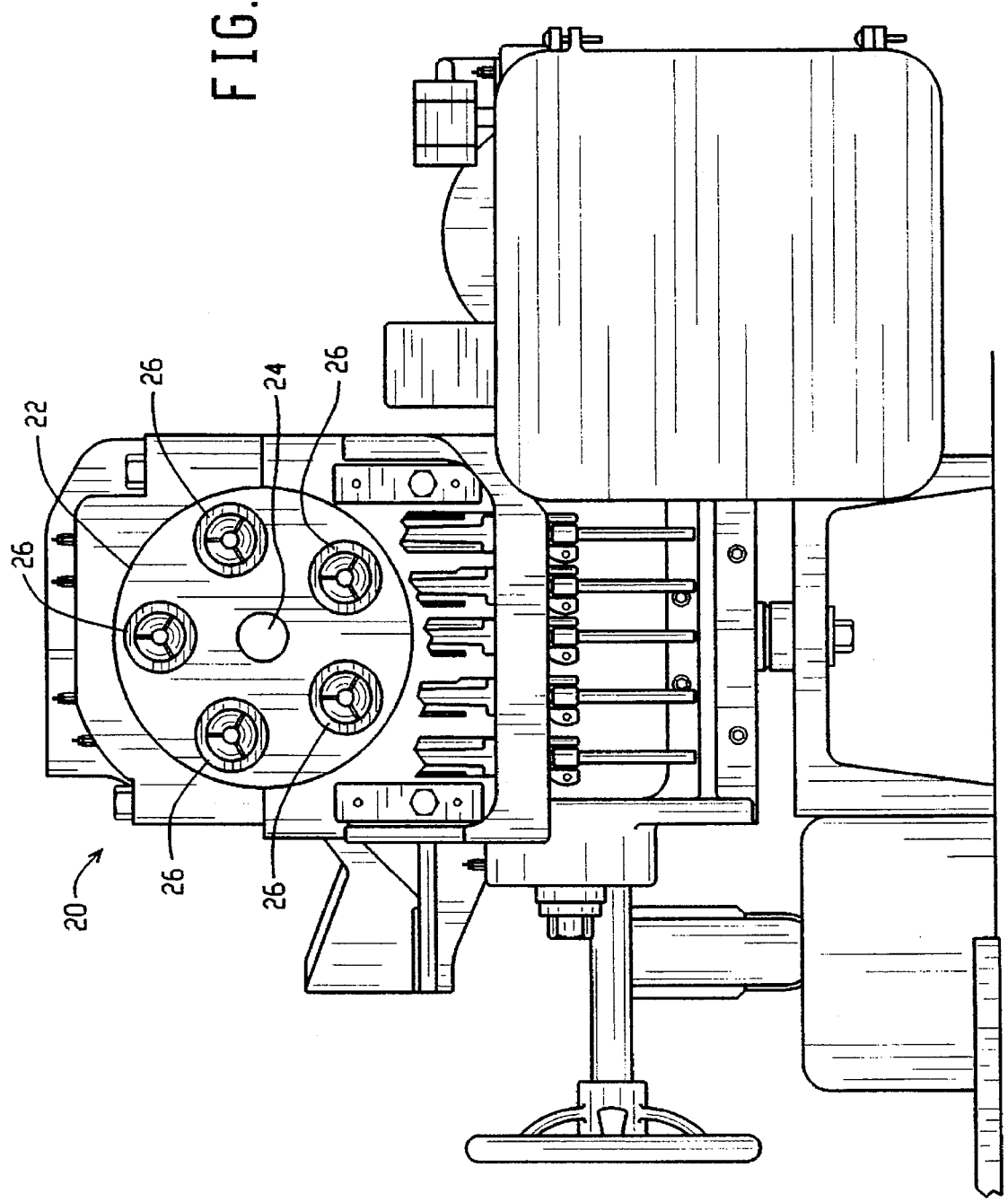

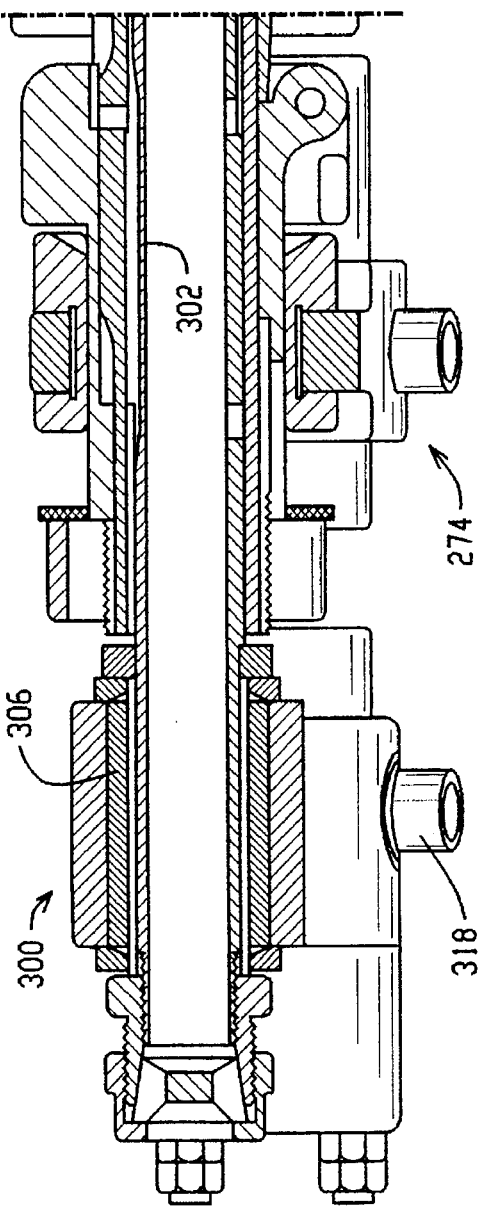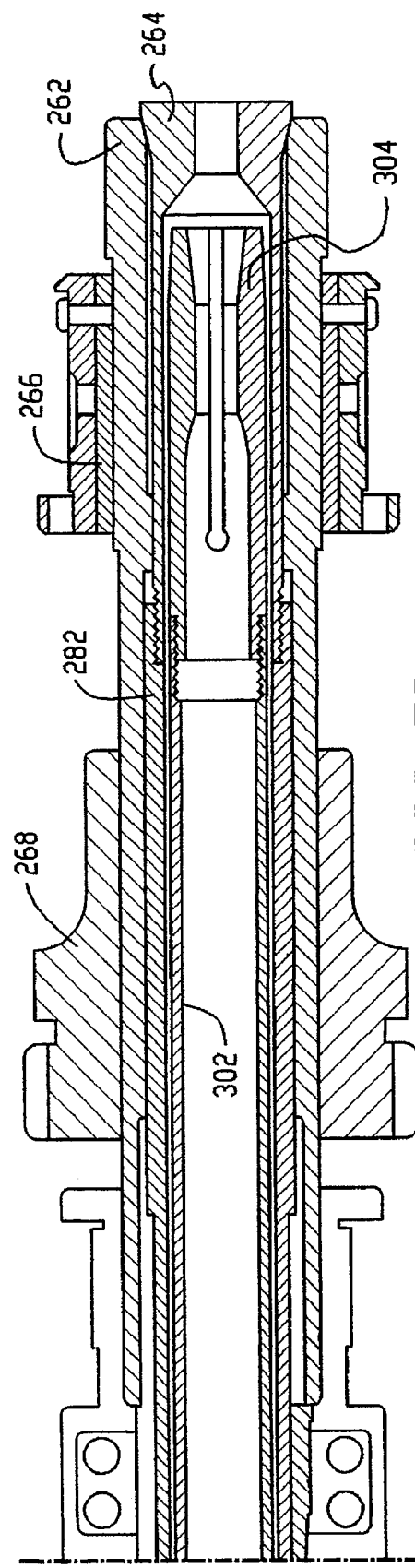
FIG. 5A
FIG. 5B

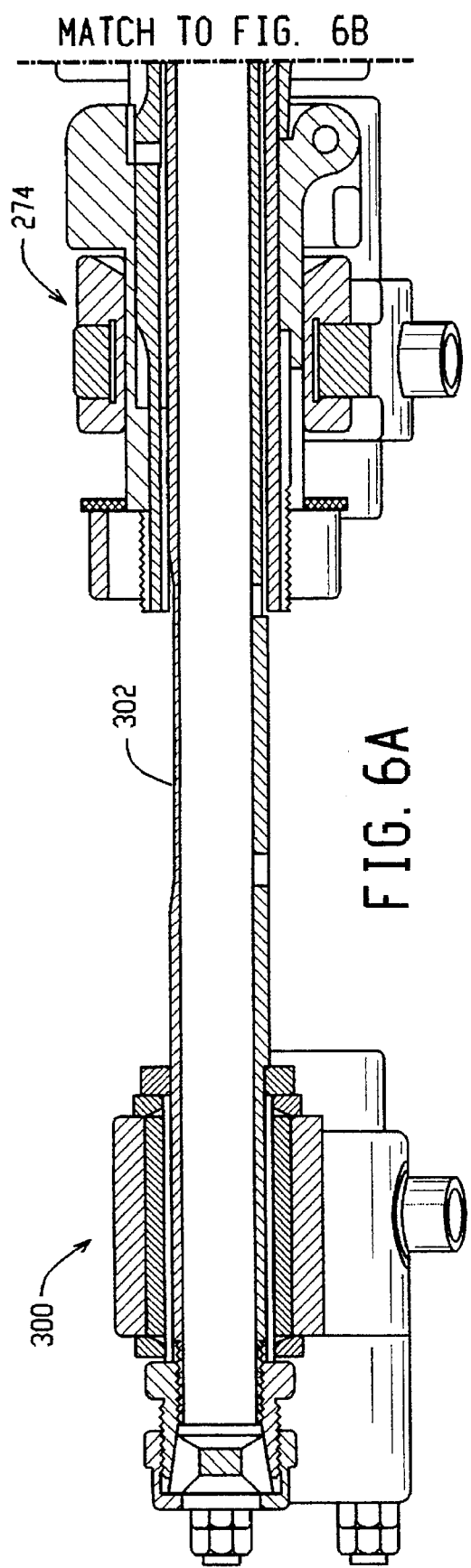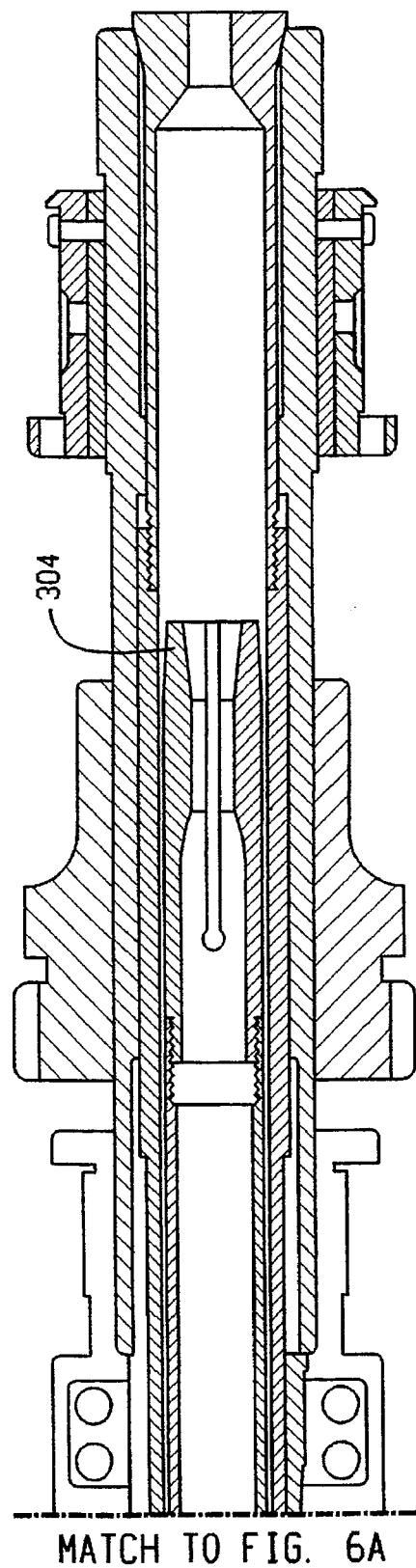

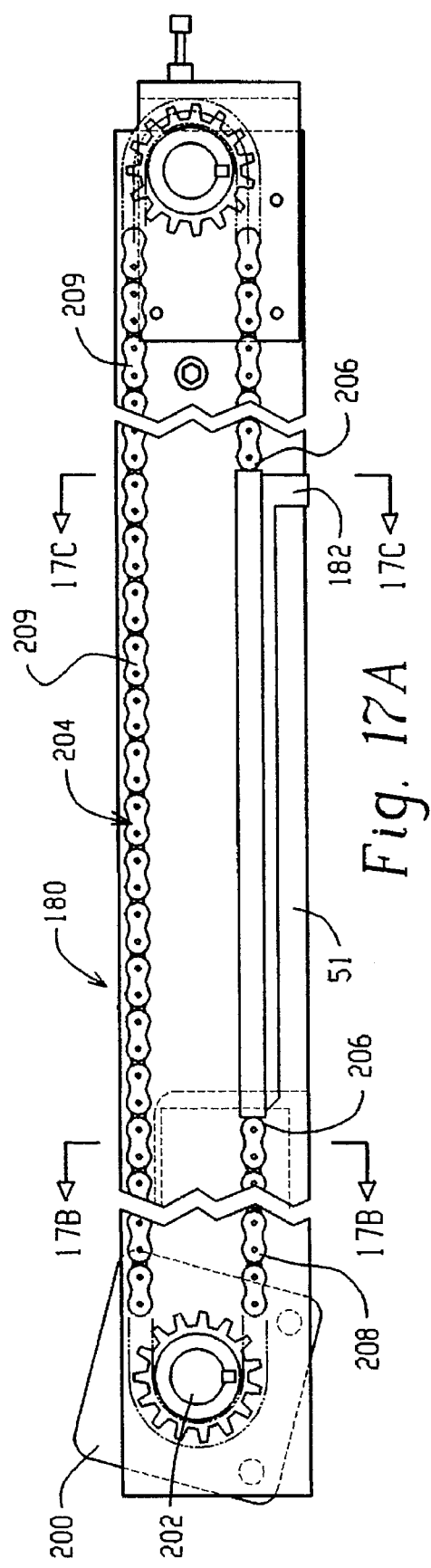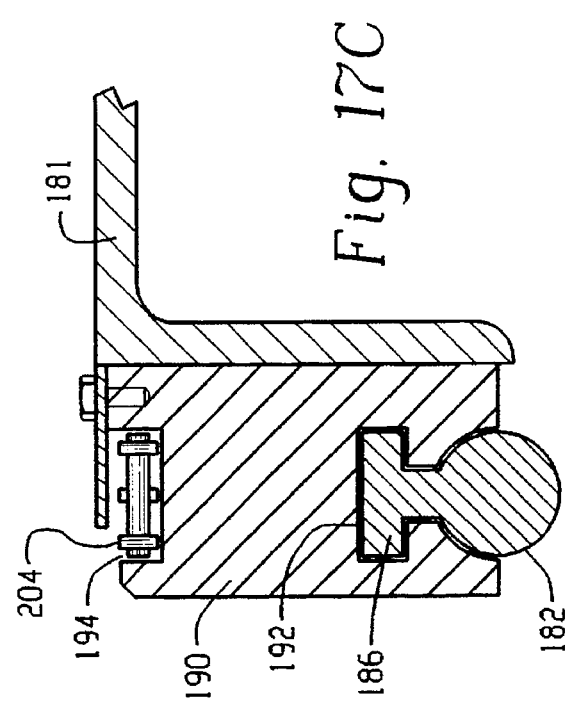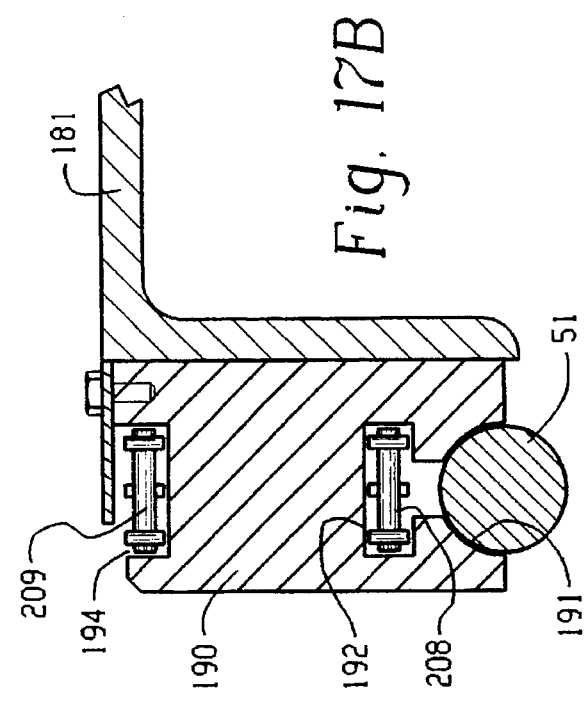

5,642,650

STOCK DEPLETION SENSOR

TECHNICAL FIELD

This invention relates to machine controls and sensors. More particularly, it relates to a stock depletion sensor for bar fed machines with feed finger style bar feed mechanisms. Representative applications include automatic screw machines, CNC (Computer Numerical Control) lathes and the like.

BACKGROUND

Automatic screw machines, CNC lathes and similar bar fed machines have been used for many years to machine small parts in large volumes. These machines provide a reliable, precise and economical way for producing a wide variety of parts, including air and hydraulic fittings, hose fittings, electrical fittings and connectors, carburetor parts, spark plugs, and various transmission and brake parts including shafts, pins, ABS brake cylinder pistons, screws, gears, splines, grease fittings and the like.

In many of these machines, a bar loader supplies bar stock to a plurality of work spindles mounted on a rotary spindle carrier. The carrier is indexed from work station to work station. Tools such as dovetail and circular form tools, drills, taps, reamers, thread rolls and shave tools, located at the different work stations, perform a variety of machining steps on the bar stock. When the machining sequence has been completed, the finished part is severed from the stock, and the stock is advanced so that the cycle may be repeated. When a length of stock has been consumed (referred to frequently as "stock depletion"), another bar of stock must be loaded into the work spindle. If stock depletion goes undetected, or if stock is not fed properly because the stock is undersize or the tension on feed fingers has dropped through wear: 1) The machine can run empty for some period of time—as the name "automatic" implies, once setup these machines run virtually unattended, and without stock depletion detection are often found running empty—causing lost productivity. 2) If there is only enough material to partially feed stock, tooling such as part pick offs will malfunction when the short part comes around. These situations can result in what can only be described as a "wreck"—which can mean destroyed tools, damaged machines, further lost productivity while the machine is retooled, or even cutting oil fires ignited by the friction from wrecked tools tangled with damaged stock. 3) Finished parts are generally deposited in a simple parts basket by the machine when completed. If short fed out stock successfully navigates its way through the tooling stations, a too short part will be deposited in the parts basket along with all the good parts. Many customers will reject a complete order if they find even one part in their shipment not made to the print. To avoid this possibility, many screw machine shops are doing 100% inspection in order to sort out the short pieces from the good ones. This is very expensive. Thus, it is vitally important to be able to detect stock depletion as soon as it occurs and take corrective action. At the same time, however, it is highly desirable to use the maximum amount of any length of stock before restocking, in order to obtain the maximum recovery rate.

Typical bar fed machines use reciprocating feed tubes to move the bar stock through the work spindles. Substantially all automatic screw machines, and some CNC lathes and other bar fed machines, use flexible feed fingers at the front end of the feed tube. The feed fingers grip the stock firmly enough so that they can move the stock when it is not clamped in place, but will slide over the bar stock when it is clamped. The feed fingers are used in connection with a chuck that grips the bar stock. To advance the stock, the feed fingers are retracted (moved away from the chuck), the chuck is opened, and the feed fingers are advanced (moved back toward the chuck), thereby advancing the bar stock through the chuck. The chuck then closes and regrips the bar stock to prepare for another cycle of machining operations.

At some point before the next time for advancing the bar stock, the feed fingers will again be retracted. The force that is necessary to retract the feed fingers will depend upon whether there is still bar stock in the fingers. If there is enough stock in the feed tube so that the feed fingers grip the bar stock for the entire retraction process, the force required to retract the feed tube will include the force required to drag the feed fingers over the bar stock, which is now clamped in the chuck. On the other hand, if the stock has been depleted and the feed fingers slip off the stock at any time in the retraction process, the force required to move the feed tube will just be the amount required to overcome friction in the feed tube slide assembly. This is typically on the order of 1 to 5 lbs, as opposed to about 8 to 150 lbs to retract the feed tube assembly when the feed fingers are gripping bar stock.

Attempts have been made to use the change in force required to move the feed tube as a means of sensing stock depletion. One such system relies upon the momentum of the feed slide assembly to carry the slide far enough, when stock is depleted, to operate a micro switch. Due to variations in the drag on the feed tube and feed slide, however, this method is not fully dependable.

Another form of stock depletion sensor for automatic screw machines, commonly called a short part detector, positions a sensor in front of a spindle where it can detect that not enough stock was fed out. However, when a bar is already fed out, that spindle is no longer at the machine station where stock can be easily removed or a new bar loaded. The resulting drawback of a short part detector is that a short piece of stock has now been introduced into the tooling area and there is no way to remove it. Depending on tooling, the operator may have to cut the short piece off with a hand saw and then index the machine around until the empty spindle returns to the bar load station. Conversely, in the case of the stock depletion system, the short remnant can be removed and a new bar can be loaded immediately either automatically by a bar loader, or manually by the operator.

OBJECTS OF THE INVENTION

An object of this invention is to provide a stock depletion sensor that is more reliable than previous detectors.

Another object is to provide a sensor for detecting worn feed fingers or undersized stock.

A further object is to provide a system for predicting that the next attempt to feed stock in a bar fed machine will result in a short feed, and stopping the machine before the short feed occurs.

Yet another object is to provide a more reliable mechanism for detecting stock depletion in a bar fed machine with: a reciprocating feed tube assembly; and a stock feeding mechanism that moves the feed tube towards and away from a chuck; said feed tube having feed fingers that: a) grip stock in the tube and move the stock through the chuck when the chuck is opened and the tube is advanced; and b) slide over the stock when the chuck is closed and the tube is retracted.

This invention accomplishes these objectives by providing a stock depletion sensor comprising a body that presses against a roller or other connecting member extending laterally from the feed tube assembly. A plunger or other contact member extends through the body and contacts the roller. The contact member is biased to extend from the body with a biasing force greater than the force required to move the feed tube away from the chuck when there is no stock in the feed tube, but less than the force required to move the feed tube away from the chuck when stock is gripped by the fingers and gripped by the chuck.

The stock depletion sensor is mounted on a stock feeding member so that the tip of the contact member or the body of the sensor press the connecting member to move the feed tube away from the chuck. When there is no stock in the tube, i.e. when stock is depleted, the drag on the feed tube is not sufficient to overcome the biasing force. However, when there is stock in the feed tube and the feed tube is retracted, the biasing force is overcome, the plunger or other contact member is moved to the point where the sensor body contacts the connecting member and moves the feed tube. The motion of the plunger or other contact member, or its new position, initiates a signal that may be used to initiate various alarm and control functions.

Other objects and advantage of this invention will be apparent from the following detailed description, taken in connection with the following drawings.

DRAWINGS

FIGS. 1A and 1B provide a composite elevation view of an automatic screw machine (FIG. 1B) with an attached bar loader (FIG. 1A). This view is from the side of the machine where an operator is normally positioned, customarily referred to as the front.

FIG. 3 is an elevation view of the right end of the machine, partially cut-away to show the end of the work spindles and the spindle carrier.

FIGS. 5A and 5B provide a composite view of an individual work spindle, with the feed tube advanced.

FIGS. 6A and 6B provide a composite view of the spindle with the feed tube in the retracted position, where the feed tube is prepared to advance the next increment of stock through the chuck into the machining position.

Figure 7:
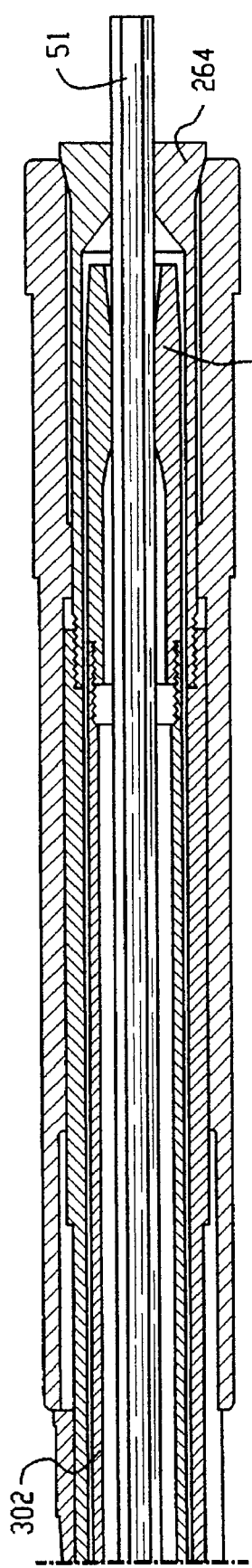
Figure 8:
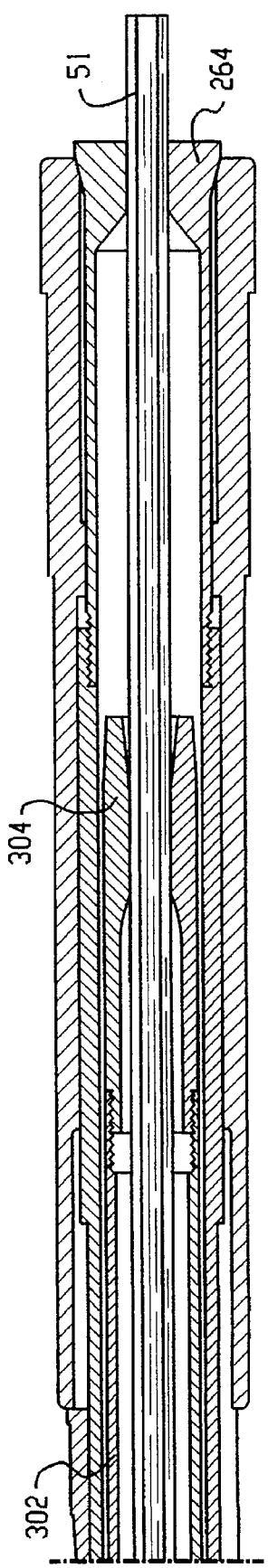
Figure 9:
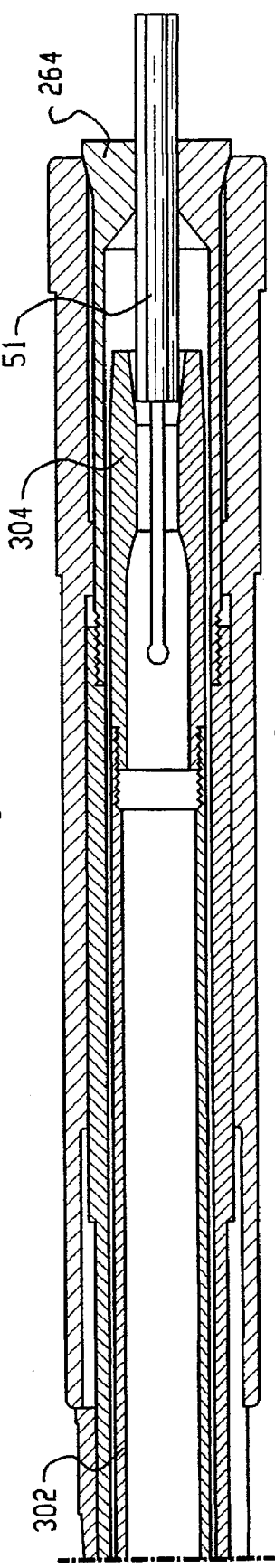

FIG. 7 is a detailed view of the front end of the work spindle, showing a bar of stock being gripped by the chuck and the feed fingers at the end of the feed tube. FIG. 8 is a similar detailed view, with the feed tube retracted. FIG. 9 illustrates the stock depleted condition, in which the feed fingers have slipped off the end of the stock part way through retraction.

Figure 10:
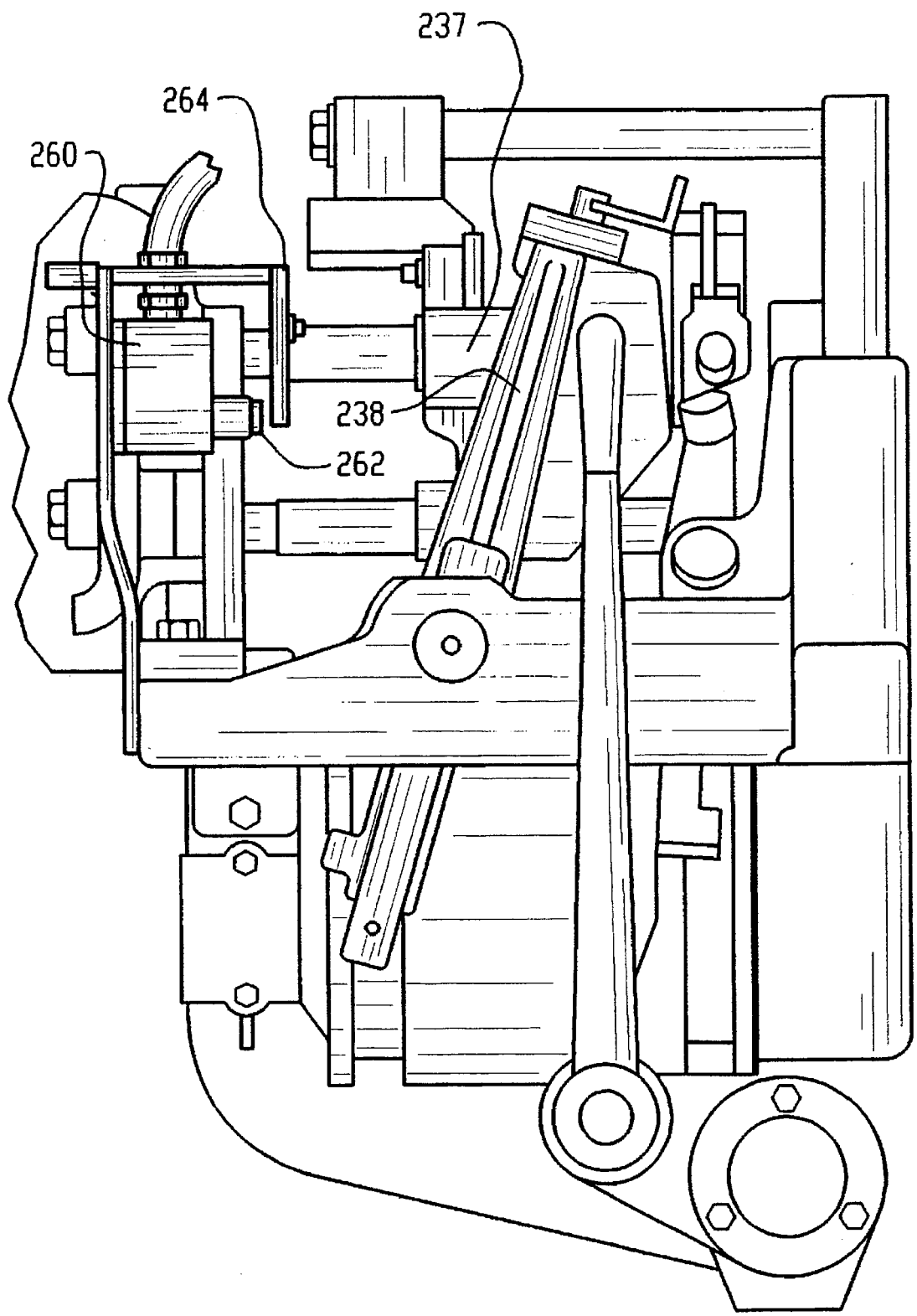

FIG. 10 illustrates one prior art stock depletion sensor.

Figure 11:
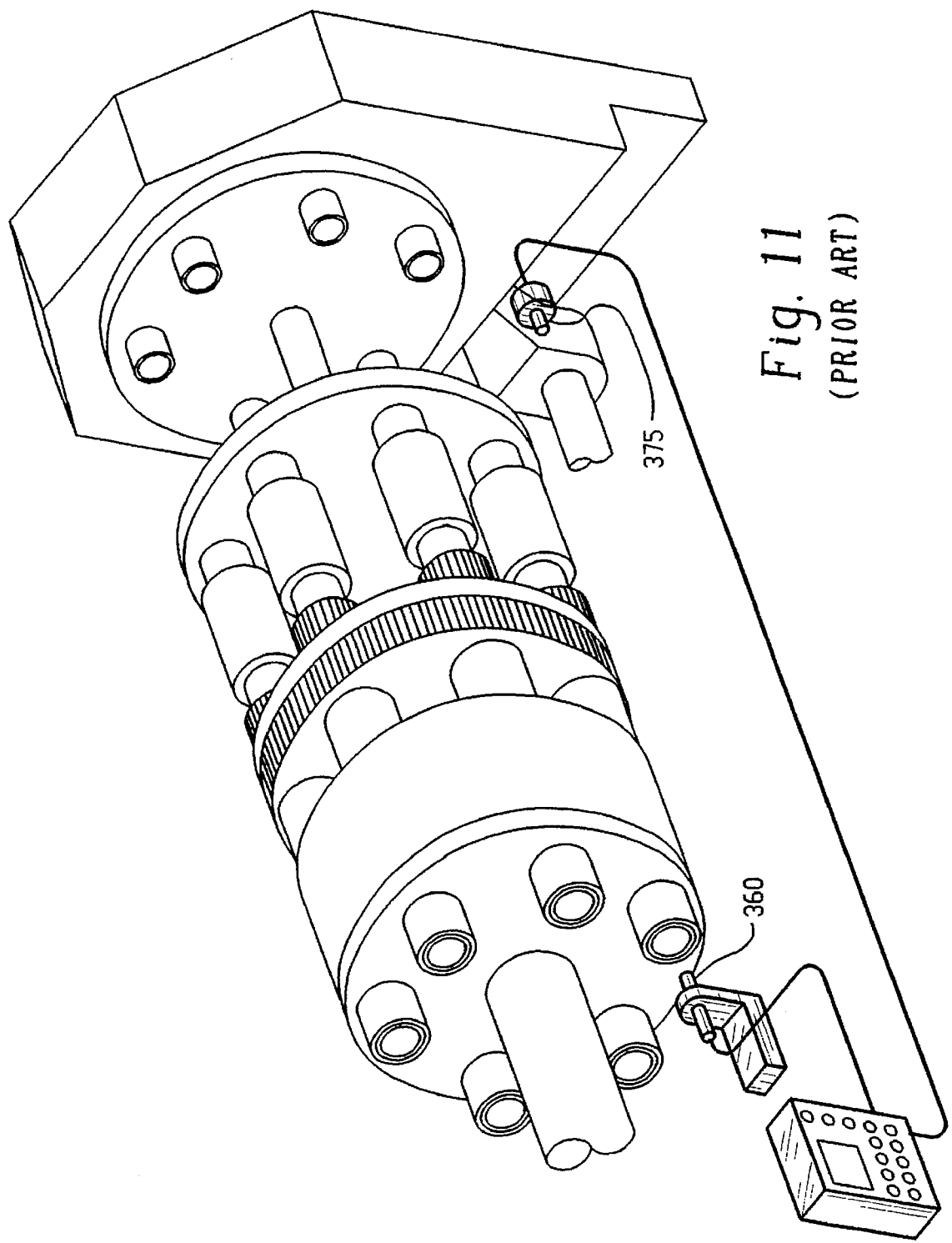

FIG. 11 illustrates a prior art short part sensor.

Figure 12:
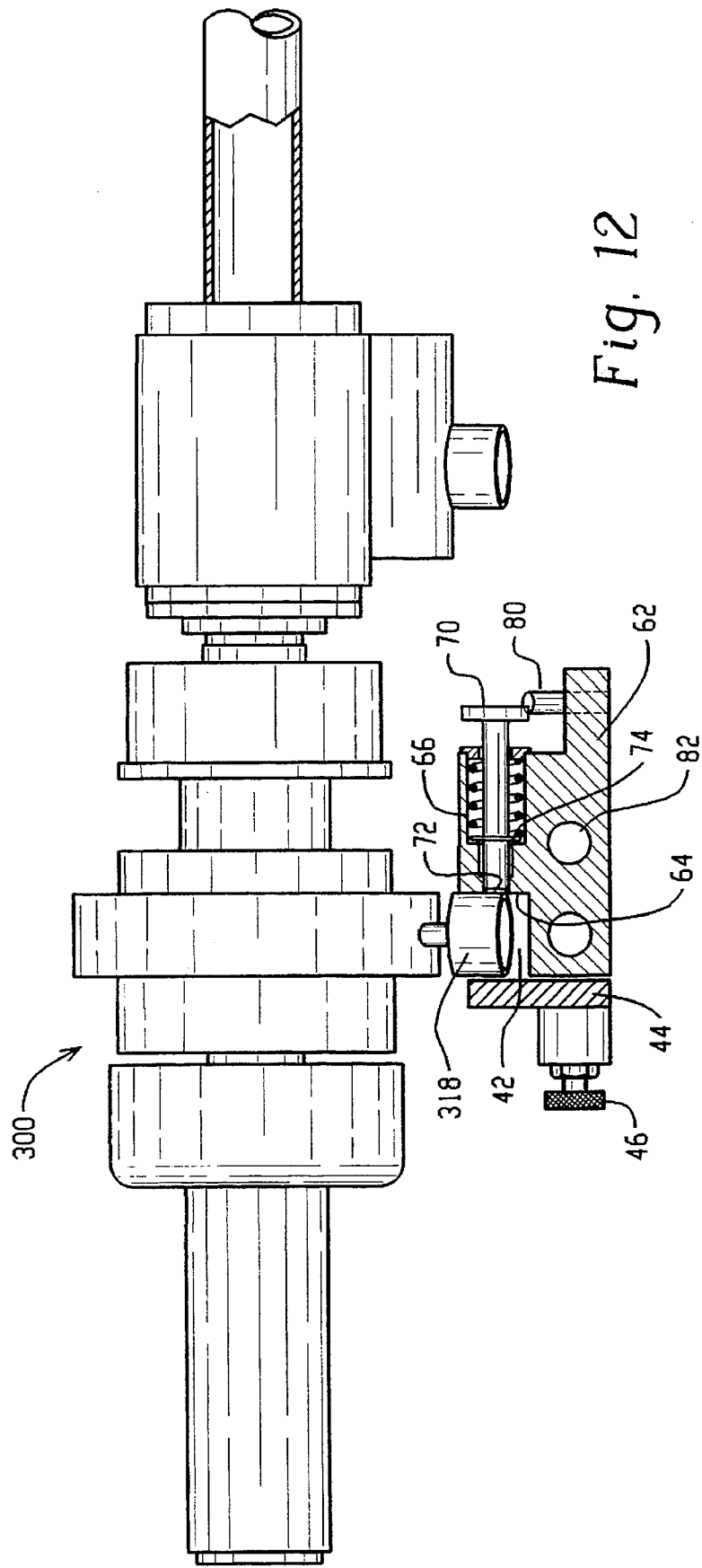

FIG. 12 illustrates a sensor embodying this invention, engaging a roller extending from a feed tube assembly.

Figure 13:
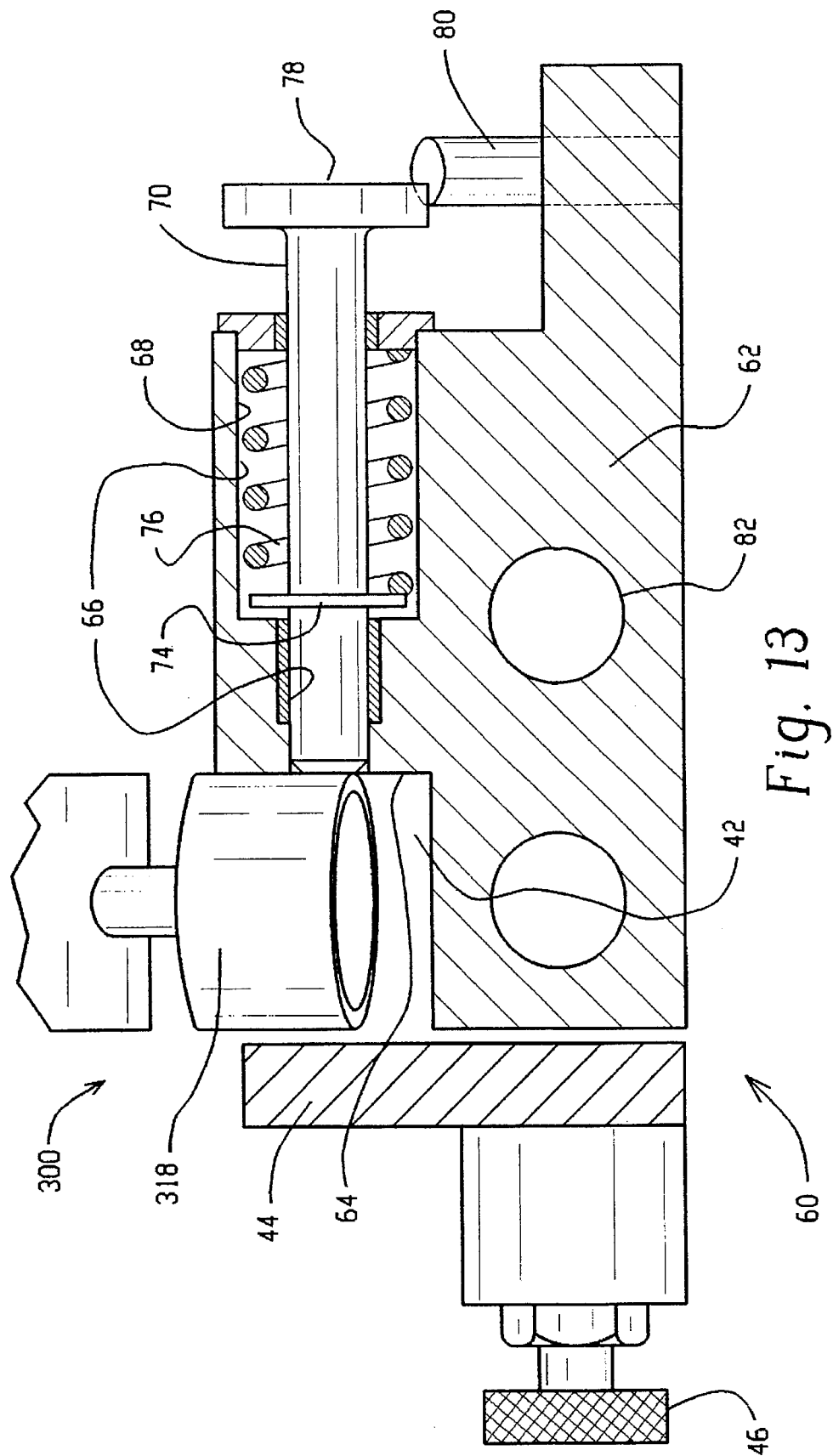

FIG. 13 is an enlarged view of the sensor shown in FIG. 12, illustrating the position of the sensor when a stocked work feed tube is retracted.

Figure 14:
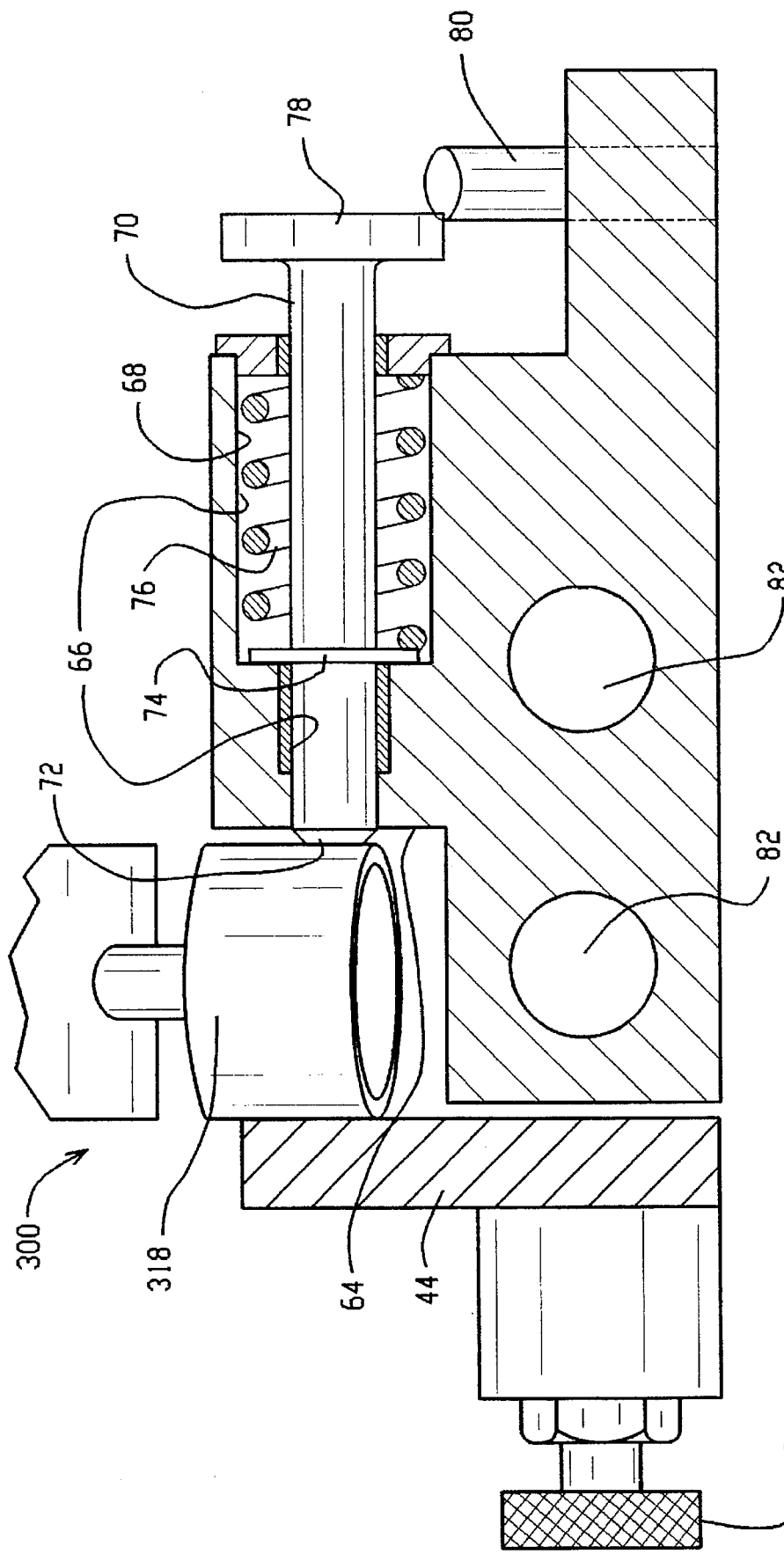

FIG. 14 illustrates the position of the sensor when an unstocked or stocked depleted tube is retracted.

Figure 15:
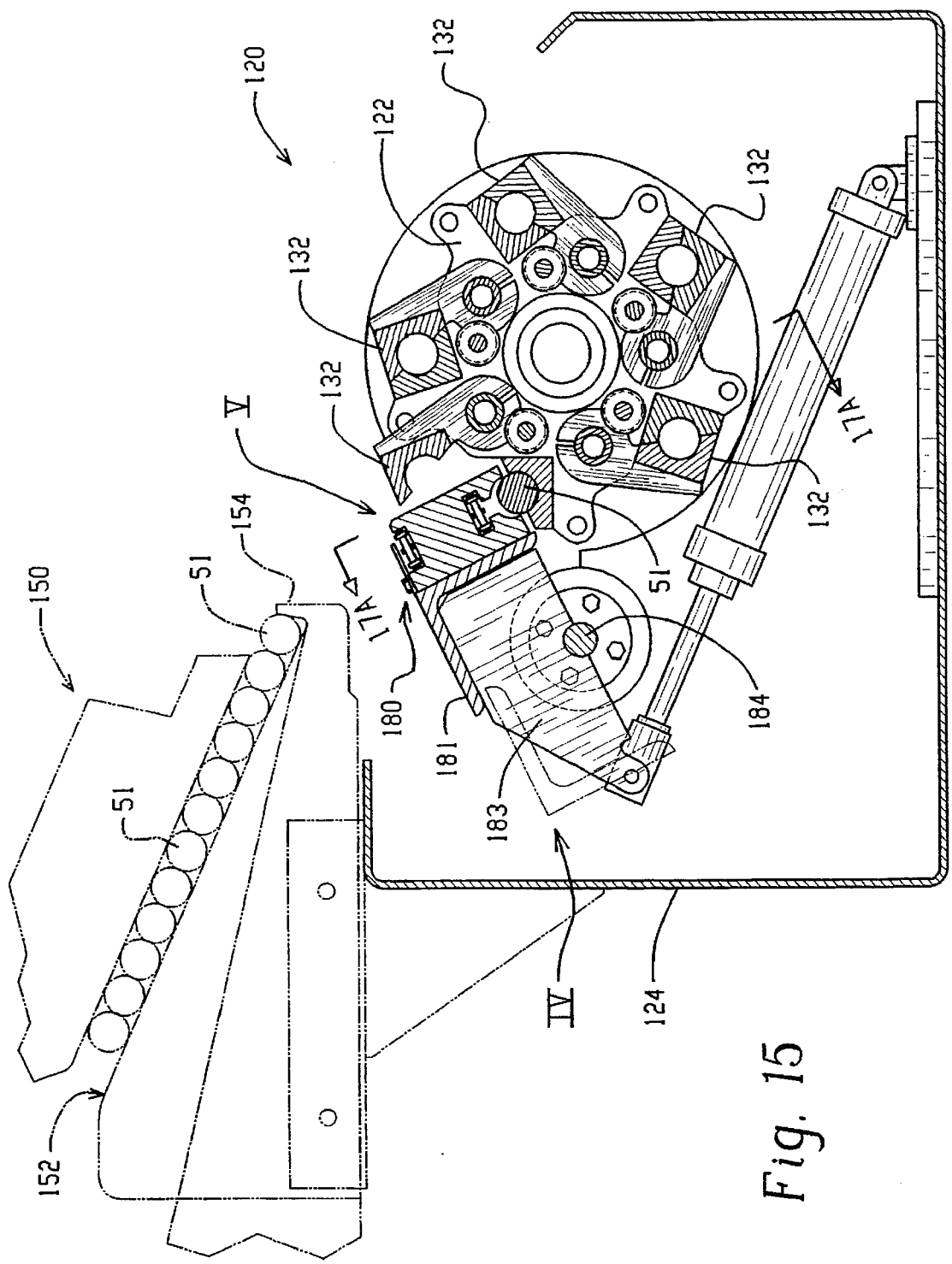

FIG. 15 is a cross-sectional view of the bar loader in FIG. 1A, along lines 15—15 in FIG. 1A.

Figure 16B:
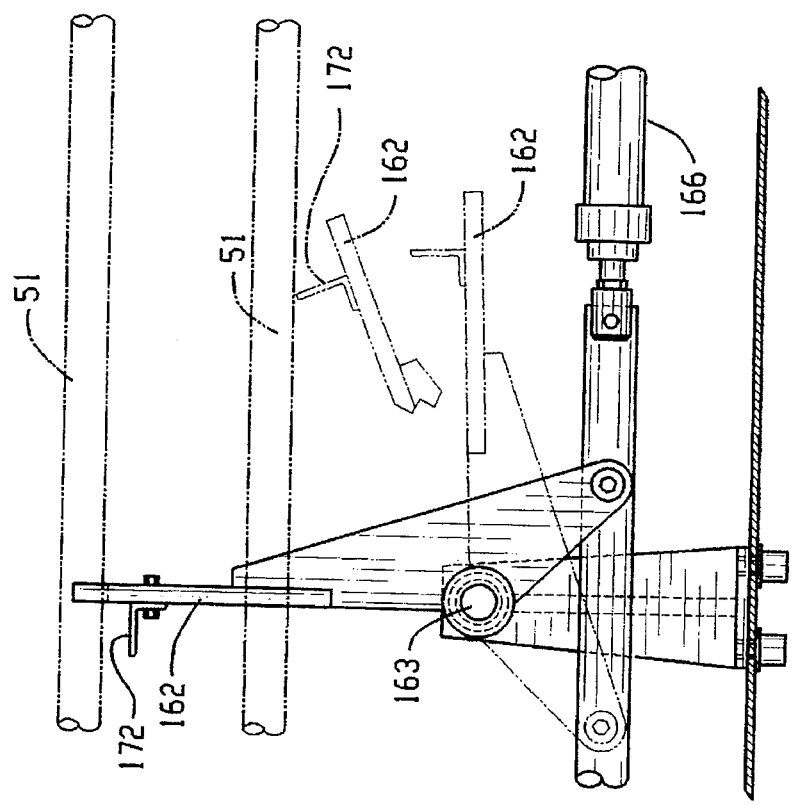
Figure 16A:
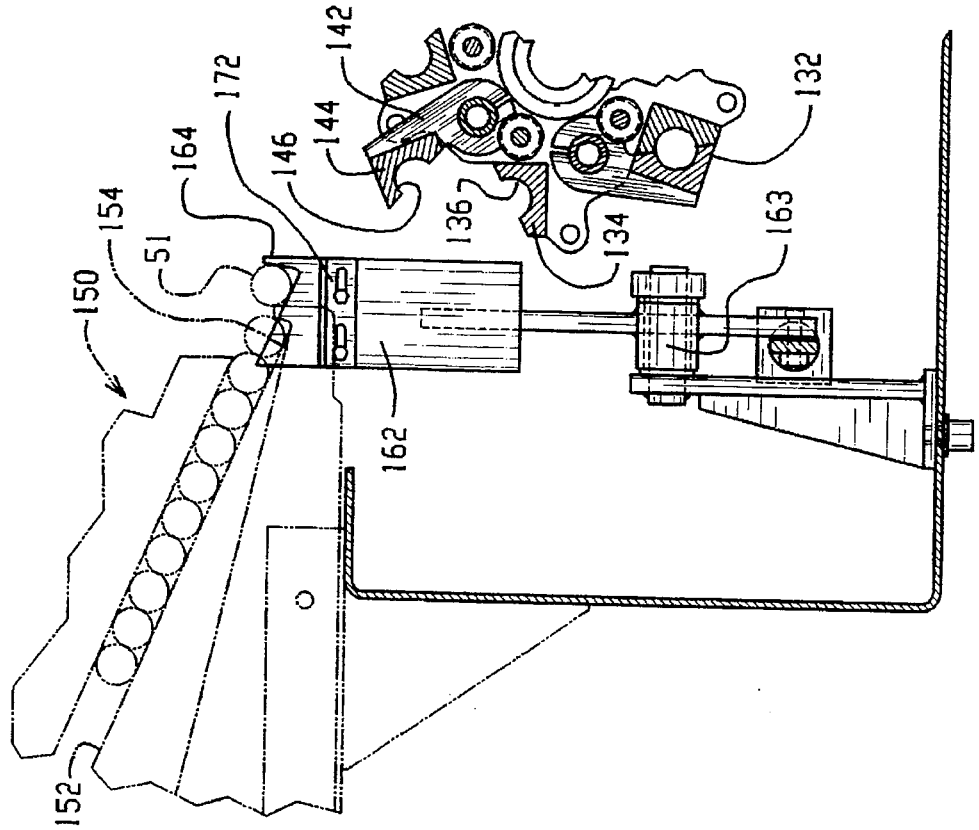
Figure 16D:
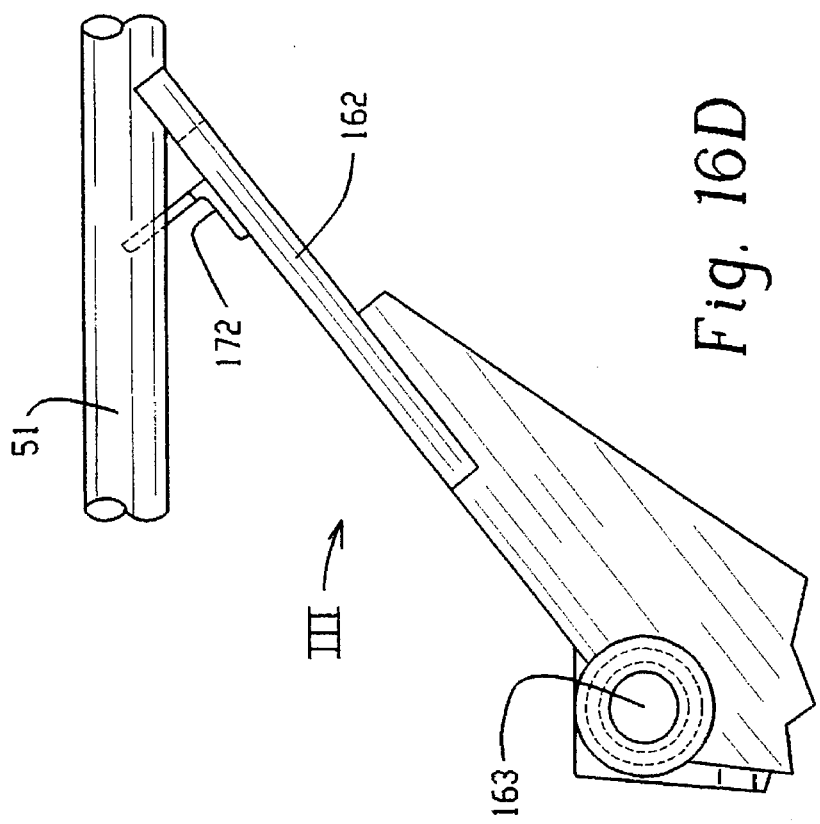
Figure 16C:
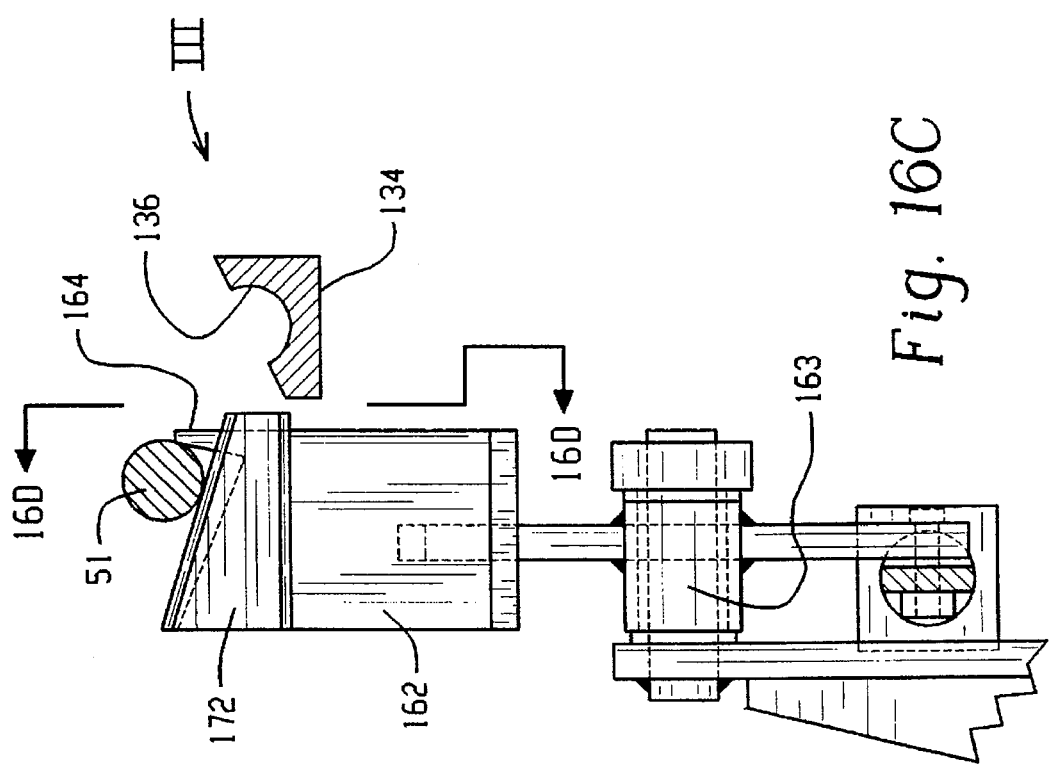

FIG. 16A is an detail view, from the same view point as FIG. 15, showing bar stock being loaded into an open tube in the bar loader. FIG. 16B is a side view of the apparatus in FIG. 16A. FIG. 16C is an enlarged detail view, from the same viewpoint as FIG. 16A, of the loading process. FIG. 16D is a further enlarged detail view, from the same view point as FIG. 16B, of the loading process.

FIG. 17A is a view, along lines 17A—17A in FIG. 15, of the pusher assembly that moves a length of bar stock into a work spindle in the screw machine, so that the end of the length of bar stock extends from the chuck and is positioned for machining. FIG. 17B and 17C are cross-sectional detail views, respectively, of the block that holds a newly loaded bar of stock in position as the bar is pushed into a work spindle by the bar pusher.

DETAILED DESCRIPTION

Figure 1B:
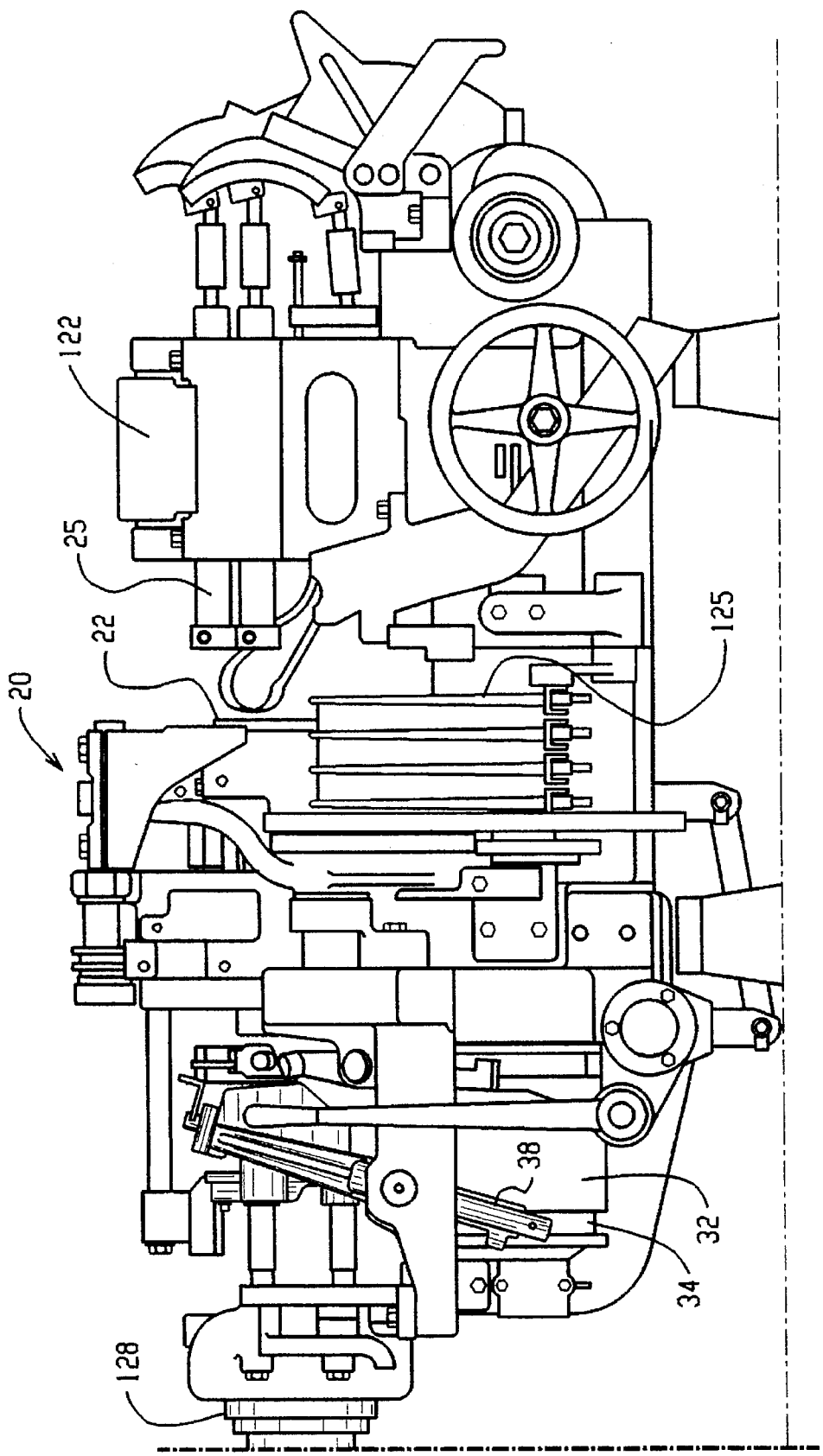

FIGS. 1A and 1B illustrate an automatic screw machine embodying this invention. FIG. 1B illustrates the screw machine, generally referred to as 20, from the front or operator's position. FIG. 1A illustrates a bar loader, generally referred to as 120, that supplies bar stock to screw machine 20.

As best seen in FIGS. 1B and 3, screw machine 20 includes a work spindle carrier or head 22 with five work spindles 26 spaced about the central axis 24 of the work spindle carrier 22. Bar stock is advanced from the bar loader 120 through the work spindles. Various end-working tools, mounted in tool spindles 25 in a stationary head, and cross-working tools, mounted in tool slides in tool arms 125, perform a variety of machining operations on the bar stock extending from the work spindles 26.

Between machining operations, the work spindles are indexed counter-clockwise, as viewed in FIG. 3, from the right hand side of the machine in FIG. 1B, through a series of five work stations, corresponding to the positions of the spindles in FIGS. 3. The position at the top of the Figures is commonly referred to as position number 4, the position at approximately 10 o'clock in FIG. 3 is referred to as position number 5, the position at approximately 7 o'clock is referred to as position no. 1, and so forth.

As shown in FIGS. 5A, 5B, 6A and 6B, each work spindle 26 includes an outer spindle 262, an inner spindle 282, and a feed tube assembly 300 with a feed tube 302 that extends inside the inner spindle. As best seen in FIGS. 7, 8 and 9, feed fingers 304, mounted at the front of each feed tube 302, grip bar stock in the feed tube 302. A chuck 264 inside the outer spindle, and attached to the inner spindle, opens to permit the stock to be advanced. The chuck then closes and regrips the stock in position for machining.

The front of the outer spindle is mounted in bearings 266 at the front of the spindle carrier 22 (FIG. 5B), and is rotated by a spindle gear 268 secured to the outer spindle 262. The inner spindle 282 and feed tube 302 rotate with the outer spindle. Chuck 264 is released to allow stock to be advanced through the spindle by a chucking mechanism 274 (FIGS. 5A and 5B), which retracts the outer spindle, thereby permitting the chuck to open. When the stock has been advanced, the chucking mechanism moves the outer spindle to the right, and the chuck closes and regrips the stock.

Figure 4:
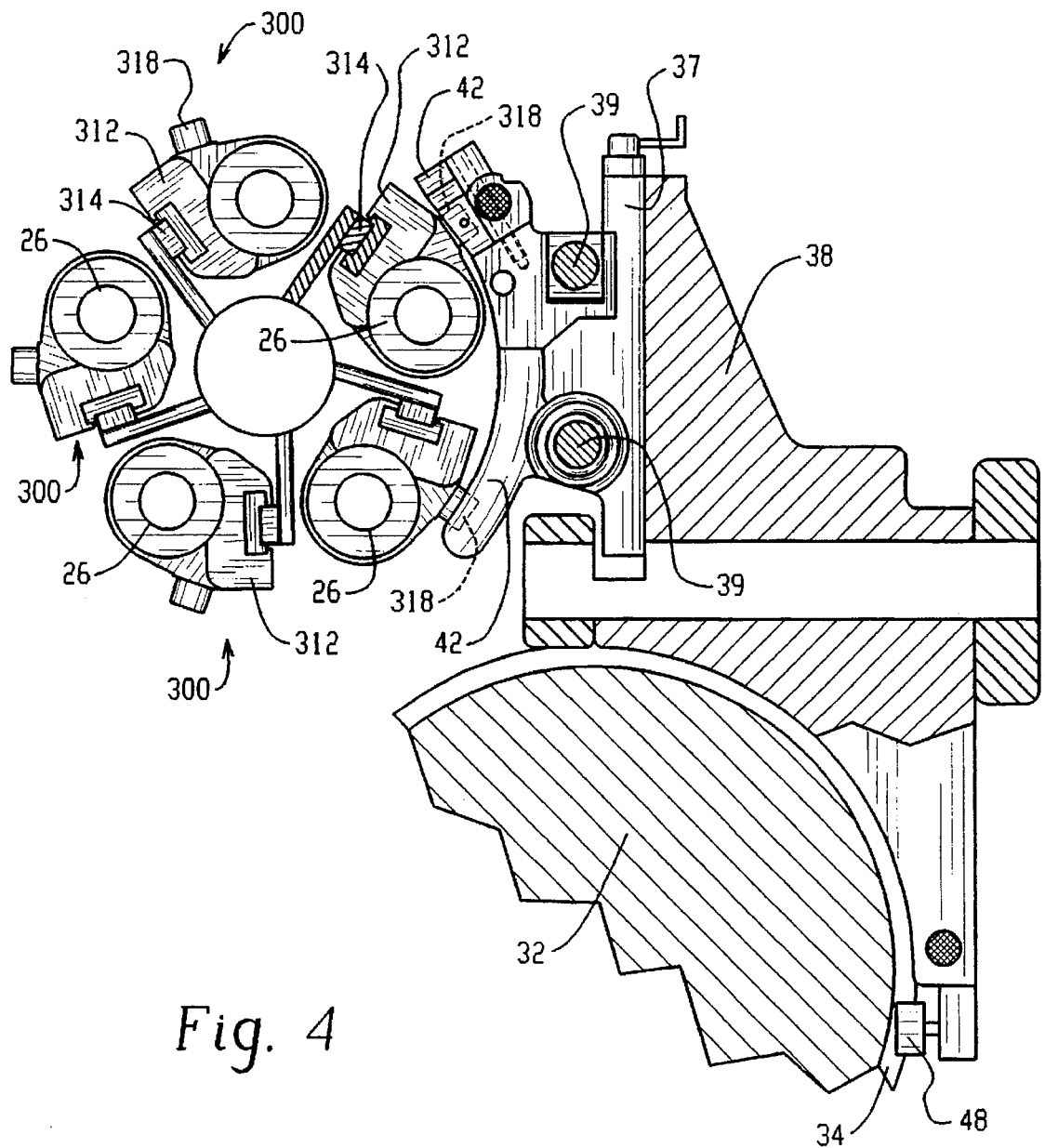
FIG. 4 is a fragmentary cross-sectional view (taken along lines 4—4 of FIG. 2A, looking in the same direction as FIG. 2B) of the work spindles and mechanisms for retracting and advancing the feed tubes to feed stock through the spindles.

As may be seen in FIG. 4, each feed tube assembly 300 includes a feed slide 312 that reciprocates along feed slide rails 314. The rear end of each feed tube 302 is supported by bearings 306 (FIGS. 5A and 5B), mounted in the feed tube assembly 300, which permit the feed tube to rotate with the outer spindle 262 and inner spindle 282.

Figure 2A:
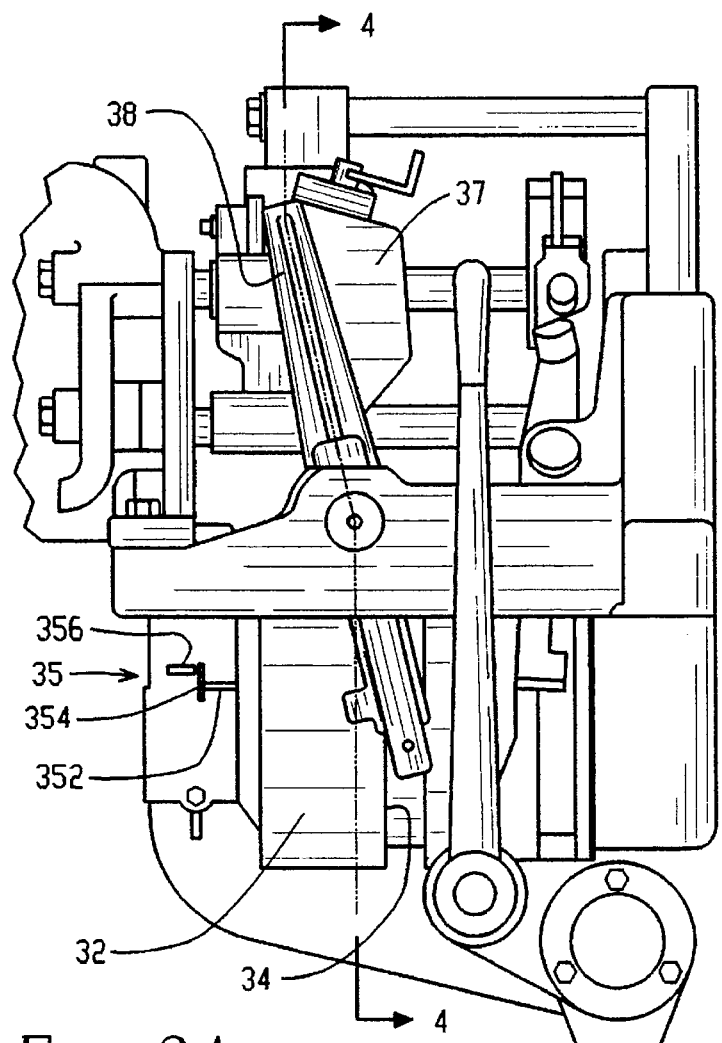
FIG. 2A is an enlarged elevation view, from the same viewpoint as FIGS. 1A and 1B, showing elements used to feed stock through the machine.

A roller 318 extends laterally from each feed slide 312. As shown in FIG. 4, as each work spindle 26 approaches work station number 5 (at approximately 2 o'clock, or on the upper right hand side, in the work spindle carrier in FIG. 4), the roller 318 enters a channel 42 within a feed finger roller guide 37. The feed finger roller guide 37 moves back and forth on rods 39, driven by a pivoting stock feeding lever 38. A roller 48 on the lower end of the stock feeding lever 38 rides in a groove 34, shown in FIG. 4, on a drum cam 32 that controls the chucking and feeding operations. The stock feeding lever is pivoted counterclockwise, as shown in FIG. 2A, to retract the feed finger roller guide 37, the roller 318, the feed tube assembly 300 and the feed tube 302, while the work spindle is at station 5. While the work spindle 26 is being indexed (clockwise in FIG. 4) to station 1, the chuck is opened, and stock feeding lever is pivoted clockwise, as shown in FIG. 1B, to advance roller 318 and the rest of feed tube assembly 300 (including feed fingers 304), which advance a new section of bar stock through the chuck.

When the feed tube assembly 300 is retracted by counterclockwise motion of stock feeding lever 38, the feed finger roller guide 37, feed tube 302 and the feed fingers 304 are retracted, i.e. moved to the left as shown in FIGS. 6A and 6B. The chucking mechanism 274 then moves the outer spindle to the left, opening the chuck. The chuck and feeding cam 32 then causes the stock feeding lever 38 to pivot clockwise, moving feed finger roller guide 37, feed tube assembly 300, feed tube 302 and feed fingers 304 back to the right, advancing the bar stock to position another section for machining.

FIGS. 7 and 8 illustrate the positions of the feed fingers at the start and finish of the retraction process, in the normal stocked condition. The feed fingers 304 grip the bar stock 51, but it is also gripped by the chuck 264. The feed fingers 304 cannot overcome the grip of the chuck, and the fingers 304 slide over the bar stock 51. By contrast, in the stock depleted condition illustrated in FIG. 9, the feed fingers 304 slip off the stock 51 while the feed fingers 304 are being retracted. When the fingers 304 slip off the stock 51, the force required to retract the feed tube 302 decreases substantially, typically from about 30 lbs to about 5 lbs.

As explained above, it is vitally important to detect the stock depletion illustrated in FIG. 9, or an improper feed resulting from undersized stock, worn fingers or the like. If these conditions are not detected, the feed fingers will retract and advance without advancing the stock. The spindle will not be properly loaded with the proper length of stock for the ensuing machining operations. Productivity will suffer, and there may be extensive damage to the tooling and machinery, requiring time consuming retooling and in some cases even more extensive repairs.

FIG. 10 illustrates a prior art system that attempts to detect stock depletion by freeing the feed finger roller guide 237 at the end of the retraction swing of the stock feeding arm 238, allowing the feed finger roller guide 237 to continue to move to the left under its own momentum. In theory, if stock is depleted and the feed fingers do not drag across the stock, the feed finger roller guide 237 will slide to the left far enough to strike a pivoted arm 264 which operates the plunger 262 of a micro-switch 260. In practice, variations in the drag on the feed slide assembly make this system significantly less reliable than is desirable.

FIG. 11 illustrates another system for detecting stock outages in a screw machine, in this case a six turret system. The illustrated system uses a sensor 360 (which may be a proximity switch with a movable, spring loaded metal cap). When adequate stock is fed out, the cap is moved into the sensing range of the proximity sensor, generating a signal. The signal from sensor 360, in conjunction with a signal from a cam switch 375 that signifies when a stocked work spindle should be positioned in front of the short stock detector 360, is used to signal when a work spindle should be restocked. This system, however, will not detect the situation illustrated in FIG. 9, where there is inadequate stock to advance another length.

FIGS. 12, 13 and 14 illustrate one of many possible sensors 60 embodying this invention, which provide a much more precise and dependable mechanism for determining when stock is depleted. Unlike the sensor shown in FIG. 11, sensor 60 indicates: 1) that the machine is out of stock; or 2) that the feed fingers are not gripping the stock properly; before the feeding stroke. This allows the machine to be restocked, or stopped to correct the problem.

The body 62 of the sensor 60 has a shoulder 64 (FIGS. 13 and 14), with a stepped bore 66 extending through the bore to the shoulder 64. A plunger 70 extends through the stepped bore 66. A disk 74 is attached to the plunger and a coil spring 76 biases the disk 74 towards the bottom of the larger section 68 of stepped bore 66. In this position, as shown in FIG. 14, the tip 72 of plunger 70 extends beyond shoulder 64.

The body 62 of the sensor is attached to feed finger roller guide 37 (by bolts extending through holes 82), in a position such that shoulder 64 of sensor 60 and the tip 72 of plunger 70 are both positioned to press against the roller 318 of a feed tube assembly 300 when the stock feeding arm 38 is swung to the retracted position. The body of the sensor, and a detent 44 (which may be released by loosening knurled knob 46 so that the feed tube assembly may be retracted manually) define the entrance to a channel 42 (along the feed finger roller guide 37) for the feed tube rollers. As may be seen in FIG. 4, the rollers 318 enter channel 42 shortly before work station 5, and stay in channel 42 until just before the spindle reaches work station 1. When a work spindle is indexed to and positioned at work station 5, the stock feeding lever 38 is pivoted counter-clockwise to the position shown in FIG. 2A, and the feed tube at work station 5 retracts. As the work spindle is indexed from work station 5 to work station 1, the chuck is opened, the stock feeding lever 38 is pivoted clockwise back to the position shown in FIG. 1B, and the feed tube advances another segment of bar stock through the chuck into position for another cycle of machining operations.

If the feed tube is stocked when it is retracted, as shown in FIGS. 7 and 8, the force required to move the feed tube assembly to the left, normally about 10 to 100 lbs, will overcome the biasing force on the plunger 70 by coil spring 76, and the plunger will be depressed until the shoulder 64 of the sensor contacts the roller 318, as shown in FIG. 13. If stock is depleted, as shown in FIG. 9, the force required to retract the feed assembly 300 will not be sufficient to overcome the biasing force on the plunger, and the plunger will remain in the position shown in FIG. 14. Similarly, if the feed fingers are sufficiently worn or the bar sufficiently undersized such that the tension provided does not create enough friction to produce the force necessary to overcome the biasing force on plunger 70, the plunger will again remain in the position shown in FIG. 14.

Figure 2B:
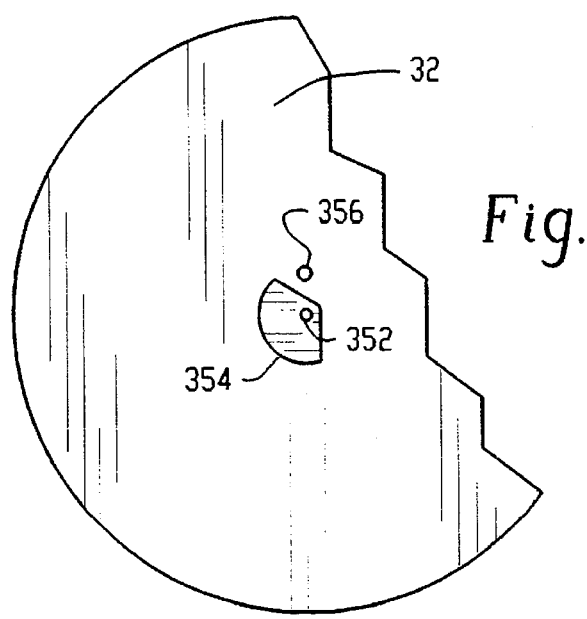
FIG. 2B is a further enlarged detail view, from the left end of FIG. 2A, showing a cam switch assembly.

When a stocked feed tube 302 is retracted, the changed position of the head 78 of plunger 70 is detected by a proximity sensor 80. Sensor 80 operates in combination with a cam switch assembly 35 on the chuck and feed cam 32, shown in FIGS. 2A and 2B, to generate a stock depleted signal which may be used to stop screw machine 20, activate alarms, or initiate a bar load.

Cam switch assembly 35 includes a disk segment 354, mounted on a shaft 352 that is threaded into the mounting shaft for the chuck and feed cam 32, which rotates with cam 32. Disk segment 354, in the illustrated embodiment, comprises a arc of approximately 120 degrees, and rotates through the sensing field of a proximity detector 356, optical or photoelectrical sensor, electromechanical micro-switch or the like. Detector 356 is timed to signal a controller that the feed tube 302 is retracting. If the proximity sensor 80 in stock depletion sensor 60 is not activated during the time the cam switch assembly 35 is active, i.e. when the disk segment 354 is in the sensing field of proximity detector 356, a stock depleted signal is generated. As indicated above, this signal may be used to stop screw machine 20, activate alarms or initiate a bar load.

Proximity sensor 80 may be any of a number of commercially available sensors, many of which operate by generating an RF field which is disturbed by a metal head 78 of plunger 70, including Turck Model No. BiO, 8-G05-AN6X and Telemecanique Model No. XS1 N05NA310. Optical or photoelectrical sensors including white light, infra red (light emitting diode) or laser sensors, and electromechanical microswitches activated by the position of plunger 70, may also be used.

As mentioned above, the stock depleted signal generated by the proximity sensor 80 in stock depletion sensor 60, in cooperation with the proximity detector 356 in cam switch assembly 35 and conventional circuitry well known to those skilled in the art, may be used to load a length of bar stock by bar loader 120, which is illustrated in FIGS. 1A, 15, 16A–16D and 17A–17C. As shown in FIG. 1A, bar loader 120 has a case 124 mounted on supports 126 so that the bar loader is aligned with the work spindle carrier 22 in screw machine 20. Case 124 houses a stock reel 122 mounted for rotation about the same axis as the work spindle carrier 22. As best seen in FIG. 15, stock reel 122 has five bar holders or tubes 132, each of which can be opened to receive a new length of bar stock. Each tube 132 is aligned with one of the work spindles 26 in the spindle carrier 22. A coupling header 128 (shown in FIG. 1B) at the right end of the stock reel 122 slides into the feed slide rails 314 on work spindle 26, and the work spindle and bar loader stock reel rotate together.

Referring to FIGS. 15 and 16A, each stock tubes 132 has a stationery tube shell 134 with a semi-circular channel 136, and a movable tube shell 144 with a semi-circular channel 146. The moveable tube shells 144 are mounted on pivot arms 142 so that tubes can be opened to receive a new length of bar stock.

Bar stock 51 is stored in a rack 150 having a series of sloping ramps 152, one of which is shown in the FIGS. 15 and 16A. Each ramp 152 has a stock stop 154 at its lower end that prevents the bars 51 from rolling or sliding out of the rack 150. As the loading sequence begins, the stock tube corresponding to the empty work spindle 26 in screw machine 20 is opened, as shown in FIGS. 15 and 16A, to receive a new bar of stock.

A series of escapement arms 162 are spaced along the bar loader (one is shown in FIGS. 16A, 16B, 16C and 16D). Escapement arm 162 is pivoted (by hydraulic cylinder 166) on shaft 163. The escapement arm pivots between a horizontal or stored position I (shown in phantom in FIG. 16B) and an upright lifting position II. In the upright position the escapement arm 162 picks up one length of bar stock 51 from sloping ramp 152, and allows the bar to move over stock stop 154, on the lower end of ramp 152, to a stock stop 164 on the escapement arm.

As the escapement arm is pivoted back towards the horizontal or stored position I, a secondary sloping rack 172 on escapement arm 162 contacts bar 51 (intermediate position III, shown in FIG. 16C and in phantom in FIG. 16B) and lifts the bar 51 over stock stop 164, allowing the bar to drop into the open stationary tube shell 134.

The escapement arm 162 continues to pivot into stored position I, and a pusher assembly, referred to generally as 180 and shown in FIGS. 15, 17A, 17B and 17C, is pivoted into position to move the newly loaded bar into the work spindle aligned with the open tube.

Pusher assembly 180 is mounted on an angle bracket 181, mounted in turn on support brackets 183 (FIG. 15) which pivot about axle 184. The support brackets and angle brackets pivot from a stored position (phantom position IV in FIG. 15) to an active position V in which the pusher assembly engages the newly loaded bar 51.

Pusher assembly 180 includes a bar pusher 182 (FIGS. 17A and 17C), with a flange 186 mounted in a channel 192 in chain retainer 190. The ends 206 of the lower side 208 of a drive chain 204 are also attached to the bar pusher 182. The upper side 209 of the drive chain runs through another channel 194 on the upper side of chain retainer 190.

With the pusher assembly in the active position, as seen in FIGS. 15 and 17B, a semi-circular channel 191 at the bottom of chain retainer 190 fits over the top of the newly loaded length of bar stock 51 and holds it in position in stationary tube shell 134. Motor 200, sprocket 202 and drive chain 204 then move bar pusher 182 towards the screw machine 20, pushing the newly loaded length of bar stock 51 along the semi-circular channel 136 in stationary tube 134, into the corresponding work spindle 26, and through the chuck 264 at the front of the work spindle into position for machining. Pusher assembly 180 is then pivoted to the stored position, the movable section tube shell 144 closes, and the tube 132 holds the bar stock in position as it is indexed from work station to work station on the screw machine and advanced through the work spindles 26 by the feed tube assemblies.

As may be seen from the foregoing description, this invention provides a precise, flexible and dependable mechanism for detecting a depleted feed tube or a tube in which the feeding mechanism has malfunctioned, before there has been any significant loss of productivity or any damage to the machine. Those skilled in the art will readily appreciate that numerous modifications may be made to the embodiments described herein within the scope of this invention, which is defined by the following claims.

We claim:

1. A multi-spindle bar fed machine comprising:
    a plurality of work spindles mounted on an indexing head, each of said spindles having:
        a chuck and a reciprocating feed tube with feed fingers adapted to grip stock in said tube and move said stock through said chuck when said chuck is open; and to slide over said stock when said chuck is closed; and
        a connecting member linked to said feed tube;
    wherein said machine further comprises a stock feeding member and a stock depletion sensor, said sensor comprising:
        a body mounted on said stock feeding member and adapted to press against said connecting member and move said feed tube away from said chuck;

a contact member biased to extend from said body and contact said connecting member with a biasing force greater than a force required to move said feed tube away from said chuck when there is no stock in said feed tube, but less than a force required to move said feed tube away from said chuck when stock is gripped by said fingers and gripped by said chuck; and means for detecting a position of said contact member.

2. A machine according to claim 1 wherein said connecting member comprises a roller.

3. A machine according to claim 2 wherein:

said stock feeding member comprises a pivoting stock feeding lever;

the body of said sensor is mounted on said lever; and the body of the sensor and the stock feeding lever define a channel for said roller.

4. A machine according to claim 1 wherein the means for detecting the position of said contact member comprises a proximity sensor.

5. A machine according to claim 4 wherein the contact member comprises:

a plunger having a tip biased to extend from said body; and a metal head adapted to enter a sensing field of said proximity sensor when a force greater than said biasing force is exerted on said tip.

6. A machine according to claim 3:

further comprising a rotary drum cam having at least one cam grove around the circumference of said cam;

wherein said pivoting lever comprises a cam follower that extends into said grove and pivots said lever.

7. A machine according to claim 6:

further comprising a cam position sensor that detects when said cam is in a position where a feed tube is retracted;

wherein signals from said cam position sensor and said stock depletion sensor generate a depleted stock signal.

8. A machine according to claim 7 wherein said cam position sensor comprises:

a disk proximity sensor that generates a sensing field; and a disk segment mounted for coaxial rotation with said rotary drum cam and positioned to rotate into the sensing field of said disk proximity sensor.

9. A screw machine according to claim 1, wherein said indexing head is mounted for rotation about a central axis, further comprising a bar loader having:

a rotary feed magazine, having a plurality of stock holders mounted for rotation about said central axis, and attached to said rotary indexing head so that said rotary feed magazine rotates with said rotary indexing head;

each of said stock holders being axially aligned with one of said feed tubes on the indexing head.

10. A stock depletion sensor for a bar fed machine having at least one rotary work spindle with:

a chuck and a reciprocating feed tube assembly having a feed tube with feed fingers adapted to grip stock in said tube and move said stock through said chuck when said chuck is open; and to slide over said stock when said chuck is closed; and a connecting member projecting laterally from said feed tube assembly;

wherein said stock depletion sensor comprises:

a body mounted on a stock feed member and adapted to press against said connecting member to move said feed tube away from said chuck;

a contact member biased to extend from said body and contact said connecting member, with a biasing force greater than a force required to move said feed tube away from said chuck when there is no stock in said feed tube, but less than a force required to move said feed tube away from said chuck when stock is gripped by said fingers and engaged by said chuck; and means for detecting a position of said contact member.

11. A sensor according to claim 10 wherein said body has a bore extending therethrough, said contact member comprises a plunger extending through said bore, and said plunger is biased to extend from said body.

12. A sensor according claim 11 wherein:

the means for detecting the position of said contact member comprises a proximity sensor; and the plunger comprises:

a tip biased to extend from said body; and a metal head adapted to enter a sensing field of said proximity detector when a force greater than said biasing force is exerted on said tip.

13. A sensor according to claim 11 wherein said plunger is biased to extend from said body by a coil spring that encircles said plunger.

14. A sensor according to claim 10 wherein said connecting member comprises a roller, and the body of the sensor and the stock feeding lever define a channel for said roller.

15. A sensor according to claim 14, wherein:

said pivoting stock feeding lever comprises a cam follower that extends into a cam groove on a rotary drum cam, said cam groove being adapted to pivot said pivoting lever between an advanced and a retracted position;

further comprising a cam position sensor that detects when said cam follower is in position to retract a feed tube;

wherein signals from said cam position sensor and said stock depletion sensor generate a depleted stock signal.

16. A sensor according to claim 15 wherein said cam position sensor comprises:

a proximity sensor that generates a sensing field; and a disk segment mounted for coaxial rotation with said rotary drum cam and positioned to rotate into a sensing field of said disk proximity sensor.

17. A bar loader for a bar fed machine having:

a plurality of work spindles mounted on an indexing head, each of said spindles having a chuck and a feed tube assembly comprising a reciprocating feed tube with feed fingers adapted to grip stock in said tube and move said stock through said chuck when said chuck is open, and to slide over said stock when said chuck is closed; and a connecting member linked to said feed tube; and a stock feeding mechanism that presses said connecting member away from said chuck; wherein said bar loader comprises:

a rotary carriage adapted for rotation with said rotary indexing head, said cartridge having a plurality of stock holders; and a stock depletion sensor comprising:
- a body mounted on said stock feeding mechanism and adapted to move said connecting member away from said chuck;
- a contact member biased to extend from said body and contact said connecting member with a biasing force greater than a force required to move said a feed tube away from said chuck when there is no stock in said feed tube, but less than a force required to move said feed tube away from said chuck when stock is gripped by said fingers and engaged by said chuck; and
- means for detecting the position of said contact member.

18. A bar loader in accordance with claim 17 further comprising:

means for generating a stock depleted signal in response to a signal from said stock depletion sensor; and means for adding stock to one of said stock holders in response to said stock depleted signal.

* * * * *